US009720223B2

(12) United States Patent
Riot et al.

(10) Patent No.: US 9,720,223 B2
(45) Date of Patent: Aug. 1, 2017

(54) INTEGRATED TELESCOPE ASSEMBLY (71) Applicant: Lawrence Livermore National Security, LLC, Livermore, CA (US)

(72) Inventors: Vincent J. Riot, Oakland, CA (US); Brian J. Bauman, Livermore, CA (US); Darrell Carter, Livermore, CA (US); Willem H. De Vries, Livermore, CA (US); Scot S. Olivier, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 253 days.

(21) Appl. No.: 14/213,968

(22) Filed: Mar. 14, 2014

(65) Prior Publication Data
US 2014/0267722 A1    Sep. 18, 2014

Related U.S. Application Data

(60) Provisional application No. 61/801,872, filed on Mar. 15, 2013.

(51) Int. Cl.
| H04N 7/18 | (2006.01) |
| G02B 23/02 | (2006.01) |
| G02B 27/64 | (2006.01) |

(52) U.S. Cl.
CPC .......... *G02B 23/02* (2013.01); *G02B 27/646* (2013.01)

(58) Field of Classification Search
CPC .......... H04N 7/18; G02B 7/003; G02B 23/02
USPC ........................................................ 348/144
See application file for complete search history.

(56) References Cited

U.S. PATENT DOCUMENTS

| 4,128,752 A * | 12/1978 | Gravel | B23K 26/066 |
| | | | 219/121.68 |
| 4,619,502 A * | 10/1986 | Bagby | G02B 17/0631 |
| | | | 359/366 |
| 5,149,970 A * | 9/1992 | Whitney | F41G 7/2253 |
| | | | 250/226 |
| 5,471,346 A * | 11/1995 | Ames | G02B 17/0808 |
| | | | 359/364 |
| 6,061,175 A * | 5/2000 | Watters | G02B 23/06 |
| | | | 359/364 |
| 7,843,650 B1 * | 11/2010 | Roberts | G02B 5/26 |
| | | | 359/712 |
| 9,020,748 B2 | 4/2015 | Olivier et al. | |
| 2002/0163582 A1 | 11/2002 | Gruber et al. | |
| 2003/0197791 A1 | 10/2003 | Ogino | |
| 2006/0132908 A1* | 6/2006 | Baun | G02B 7/1827 |
| | | | 359/366 |
| 2009/0268983 A1* | 10/2009 | Stone | H04N 3/1593 |
| | | | 382/284 |

(Continued)

FOREIGN PATENT DOCUMENTS

DE    2437316 A  * 10/2007  ............. G02B 7/182

*Primary Examiner* — Jamie Atala
*Assistant Examiner* — Richard A Hansell, Jr.
(74) *Attorney, Agent, or Firm* — Perkins Coie LLP (57) ABSTRACT

The telescopes described are configured in an integrated telescope package by permanently fixing optical components of the telescope at predefined positions without having movable or adjustable components in the optical layout of the telescope to improve immunity to vibrations and other perturbations and to maintain stability of the optical alignment.

31 Claims, 7 Drawing Sheets

(56) References Cited

U.S. PATENT DOCUMENTS

2010/0091396 A1* 4/2010 Hutson .................. F21S 11/00
    359/859
2013/0124079 A1 5/2013 Olivier et al.
2013/0275036 A1 10/2013 Olivier et al.
2014/0198222 A1* 7/2014 Blanc .................. G01M 11/005
    348/180

* cited by examiner

Flat Black Front Baffle Attenuation

INTEGRATED TELESCOPE ASSEMBLY

CROSS REFERENCE TO RELATED APPLICATIONS

This patent document claims priority from and the benefit of U.S. Provisional Patent Application No. 61/801,872, entitled "INTEGRATED TELESCOPE ASSEMBLY", filed on Mar. 15, 2013, which is incorporated by reference in its entirety as part of the disclosure of this patent document.

TECHNICAL FIELD

This patent document relates to telescopes, and systems and devices that use telescopes for capturing images.

BACKGROUND

Telescopes are well known optical instrument and have important applications in a wide range of uses. Classic telescope designs include Mersenne designs and Cassegrain designs based on folded optical configurations using reflective mirrors.

SUMMARY

The telescopes described are configured in an integrated telescope package by permanently fixing optical components of the telescope at predefined positions without having movable or adjustable components in the optical layout of the telescope to improve immunity to vibrations and other perturbations and to maintain stability of the optical alignment.

In one aspect, an integrated telescope is provided to include a front optics piece, a middle optics piece and a rear optics piece. The front optics piece is formed of a transparent optical material and has a first surface and a second flat surface opposing the first surface. The first surface includes at least one convex reflector surface with respect to the second flat surface within a central region of the front optics piece and a peripheral ring shaped region that surrounds the central region for receiving input light. The middle optics piece is formed of the transparent optical material and has a first flat surface fixed to the second flat surface of the front optics piece and a second flat surface opposing the first flat surface. The rear optics piece is formed of the transparent optical material and has a first flat surface fixed to the second flat surface of the middle optics piece and a second surface opposing the first flat surface. The second surface of the rear optics piece includes a through hole in a central region of the rear optics piece which is aligned to the central region of the front optics piece and at least one concave reflector surface with respect to the first flat surface and located in a peripheral region surrounding the through hole of the rear optics piece. The convex reflector surface of the front optics piece and the concave reflector surface of the rear optics piece are configured to form an optical telescope that directs the input light received by the peripheral ring shaped region in the first surface of the front optics piece along a folded optical path between the first surface of the front optics piece and the second surface of the rear optics piece to pass through the central region of the rear optics piece.

The above integrated telescope also includes a correction lens located in the through hole of the rear optics piece and fixed to the second flat surface of the middle optics piece to receive output light from the optical telescope, and an image sensor fixed in position relative to the rear optics piece at a focal plane of the optical telescope to receive and detect output light from the correction lens. The front, middle and rear optics pieces, the correction lens and the image sensor are fixed in position relative to one another as an integrated telescope unit.

In another aspect, a method is provided for providing telescopic imaging on a satellite or a moving platform. This method includes providing an integrated telescope assembly on a satellite or a moving platform by permanently fixing optical components at predefined positions without having movable or adjustable components in the integrated telescope assembly to improve immunity to vibrations and other perturbations during launch or normal motion of the satellite or moving platform. The integrated telescope assembly includes front, middle and rear optics pieces of a transparent material, a correction lens and an image sensor that are permanently fixed in position relative to one another in an integrated packaging. The front optics piece includes a first surface and a second flat surface opposing the first surface with the first surface including at least one convex reflector surface with respect to the second flat surface within a central region of the front optics piece and a peripheral ring shaped region that surrounds the central region for receiving input light, the middle optics piece including a first flat surface fixed to the second flat surface of the front optics piece and a second flat surface opposing the first flat surface, and the rear optics piece including a first flat surface fixed to the second flat surface of the middle optics piece and a second surface opposing the first flat surface, the second surface of the rear optics piece including a through hole in a central region of the rear optics piece which is aligned to the central region of the front optics piece and at least one concave reflector surface with respect to the first flat surface and located in a peripheral region surrounding the through hole of the rear optics piece.

This method includes configuring the convex reflector surface of the front optics piece and the concave reflector surface of the rear optics piece to form an optical telescope that directs the input light received by the peripheral ring shaped region in the first surface of the front optics piece along a folded optical path between the first surface of the front optics piece and the second surface of the rear optics piece to pass through the central region of the rear optics piece; fixing the correction lens to the second flat surface of the middle optics piece in the through hole of the rear optics piece; and fixing the image sensor relative to the rear optics piece at a focal plane of the optical telescope to receive and detect output light from the correction lens.

In yet another aspect, an integrated telescope is provided to include a front optics piece formed of a transparent optical material and having a first surface and a second flat surface opposing the first surface, the first surface including at least one convex reflector surface with respect to the second flat surface within a central region of the front optics piece and a peripheral ring shaped region that surrounds the central region for receiving input light; and a rear optics piece located at a fixed in position relative to the front optics piece, the rear optics piece including the transparent optical material and having a first flat surface and a second surface opposing the first flat surface, the second surface of the rear optics piece including a through hole in a central region of the rear optics piece which is aligned to the central region of the front optics piece and at least one concave reflector surface with respect to the first flat surface and located in a peripheral region surrounding the through hole of the rear optics piece. The convex reflector surface of the front optics piece and the concave reflector surface of the rear optics piece are configured to form an optical telescope that directs the input light received by the peripheral ring shaped region in the first surface of the front optics piece along a folded optical path between the first surface of the front optics piece and the second surface of the rear optics piece to pass through the central region of the rear optics piece. In addition, the integrated telescope includes a correction lens fixed in position relative to the rear optics piece to receive output light from the optical telescope; and an image sensor fixed in position relative to the rear optics piece at a focal plane of the optical telescope to receive and detect output light from the correction lens. The front and rear optics pieces, the correction lens and the image sensor are fixed in position relative to one another as an integrated telescope unit, and the convex reflector surface of the front optics piece and the concave reflector surface of the rear optics piece are configured to reflect input light twice by each of the convex reflector surface of the front optics piece and the concave reflector surface of the rear optics piece.

These and other aspects and features are described in greater detail in the drawings, the description and the claims.

DETAILED DESCRIPTION

In various telescope designs using reflective mirrors, the reflective mirrors are mounted at different locations relative to one another and the optical alignment of such telescopes tends to be vulnerable to vibrations, motions and other perturbations.

For example, one of the critical parameters of a telescope is the distance between the primary and secondary mirrors which is highly sensitive to perturbations. Various complex active telescope control mechanisms have been developed to provide active mirror steering or adjustment to allow for adjustment of mirror positions and re-alignment of the mirrors in a telescope. For applications where a telescope is in a vibrating environment or on a moving platform such as a vehicle, a boat, an airplane or satellite, active mirror steering or adjustment may not be sufficient to maintain desired optical alignment of a telescope. For example, the launch of a satellite or space shuttle generates violent vibrations and strong mechanical forces that can adversely change the optical alignment of delicate optical instruments such as telescopes.

Automatic re-alignment of optical mirrors in telescopes without human intervention may be possible by complex active telescope control mechanisms but such automatic alignment is subject to failure and often requires human intervention. For space-born platforms such as satellites or unmanned space stations, failure in optical alignment on telescopes presents a serious challenge to space missions. Therefore, there is a need for telescope designs that can withstand perturbations without needing re-alignment of the optical components of telescopes.

In another aspect, there is a need for compact and lightweight telescopes in a wide range of applications, including satellite applications, small space station missions and other applications. Conventional telescopes based on reflective mirrors such as Mersenne or Cassegrain type telescopes tend to be difficult to be compact due to their designs.

The telescopes described here can be configured in an integrated telescope package by permanently fixing optical components of the telescope at predefined positions without having movable or adjustable components in the optical layout of the telescope to improve immunity to vibrations and other perturbations and to maintain stability of the optical alignment. In examples described below, such an integrated telescope assembly includes front, middle and rear optics pieces of a transparent material, a correction lens and an image sensor that are permanently fixed in position relative to one another in an integrated packaging. All optical components such as the primary and secondary reflectors of the telescope and the image sensor are formed on or attached to the front, middle and rear optics pieces. Once the assembly is fully assembled, the telescope is fixed in its configuration with desired optical alignment and there is no movable or adjustable component in the optical layout of the telescope. No further optical alignment is needed. In addition, such an integrated telescope assembly with fixed optical components can use folded optical paths to reduce the overall physical dimension of the telescope while achieving desired optical performance comparable to or exceeding larger telescopes in other designs.

Figure 1:
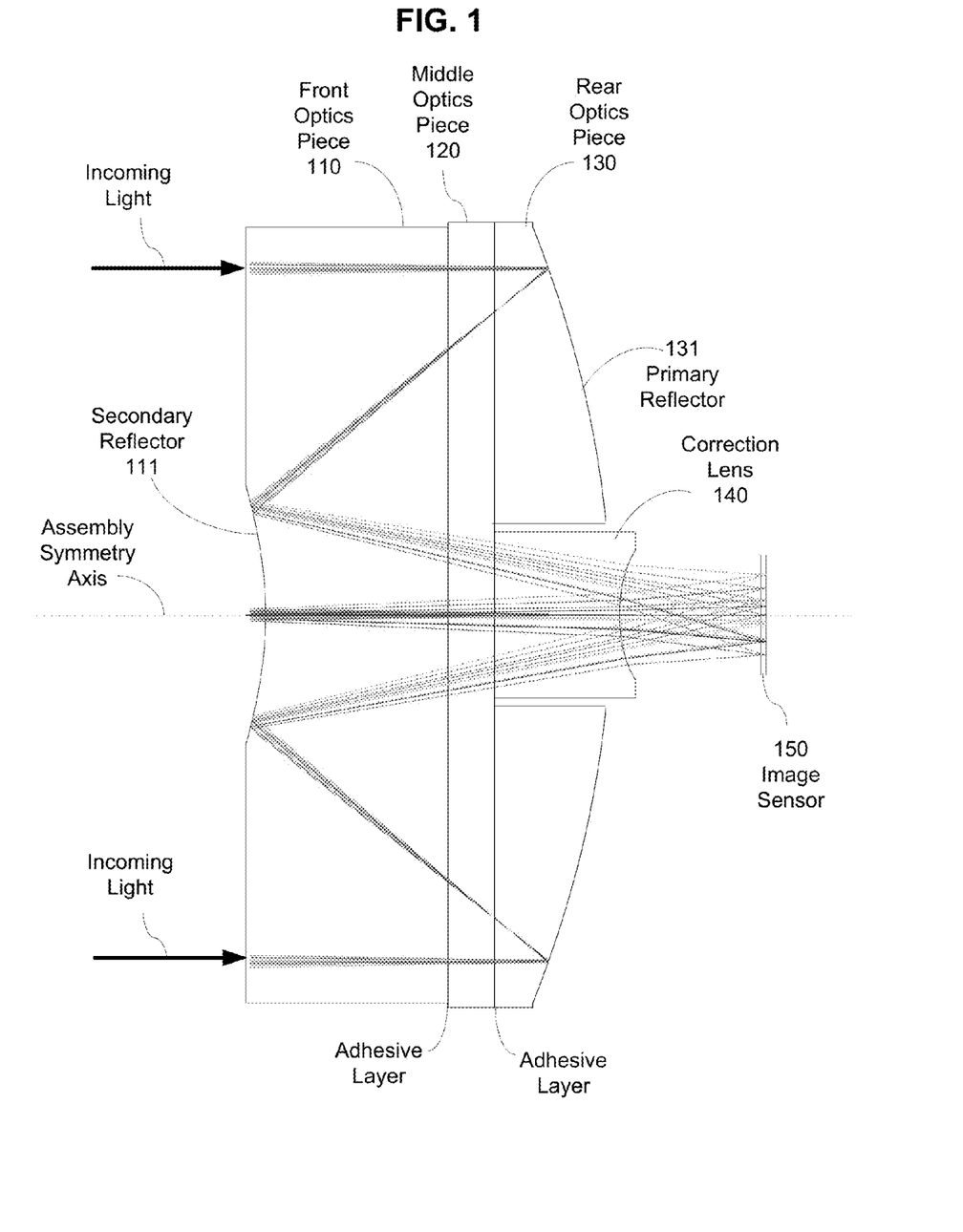
FIGS. 1, 2 and 3 illustrate examples of integrated telescope assemblies by permanently fixing optical components at predefined positions without having movable or adjustable components to improve immunity to vibrations and other perturbations and operational reliability.

FIG. 1 shows one example of an integrated telescope without having movable or adjustable components in the optical layout of the telescope. As illustrated, the front, middle and rear optics pieces 110, 120 and 130 of a transparent material are designed to have geometries and shapes to include various optical components for the telescope and are permanently fixed to one another by adhesive or other means as a single integrated unit. The front optics piece 110 is designed to receive incoming light from the object or direction where images are captured. The rear optics piece 130 is fixed to the image sensor 150 that receives and detects the image formed by the telescope from the incoming light. The middle optics piece 120 as shown in this example is a flat slab having two opposing flat surfaces for engaging the front and rear optics pieces. These pieces 110, 120 and 130 can be symmetric around a common assembly symmetry axis as shown. The use of a common transparent material for the pieces 110, 120 and 130 can provide optical index match at an interface between these pieces to reduce optical loss due to reflection or distortion due to refraction and dispersion due to presence of different optical materials. Alternatively, different optical materials may be used for these pieces when desired index matching can be accommodated. The different pieces in the example in FIG. 1, e.g., the front, middle and rear optics pieces 110, 120 and 130, can be engaged together by a suitable technique, e.g., by using suitable adhesives or cements to engage two adjacent pieces in direct contact.

In FIG. 1, the middle optics piece 120 shown as a flat slab can be used to fine tune the distance between pieces 110 and 130 during assembly since after curing the adhesive the design cannot be adjusted. The distance between pieces 110 and 130 is selected to achieve a desired focal length or distance for the telescope. During assembly, the middle flat slab piece 120 is selected from a set of flat plates of various thickness values so the selected piece has the desired thickness for the desired spacing between pieces 110 and 130. This design of using multiple pieces and the associated assembly process can provide cost reduction in comparison with a design based on a single piece material which requires expensive manufacturing process. Flat optical pieces of different thickness values can be obtained at a relatively low costs in comparison with the front and rear pieces 110 and 130 that have mirrors of curved surfaces. For example, the cost of the flat middle piece 120 may be many times, e.g., 10, less expensive than the pieces 110 and 130.

In some implementations of the design in FIG. 1, if the front and rear optics pieces 110 and 130 can be made with sufficient accuracy, the front and rear optics pieces 110 and 130 may be directly engaged to each other without the middle piece 120 to achieve the desired focal length for the telescope in FIG. 1.

The front optics piece 110 includes a first surface on the left hand side and a second flat surface on the right hand side opposing the first surface. The first surface includes a convex reflector surface 111 with respect to the second flat surface within a central region of the front optics piece 110 and a peripheral ring shaped region that surrounds the central region for receiving input light. The rear optics piece 120 includes a first flat surface on its left hand side that is fixed to the middle optics piece 120 and a second, non-flat surface opposing the first flat surface. The second surface of the rear optics piece 130 includes a through hole in a central region of the rear optics piece 130 which is aligned to the central region of the front optics piece 110. The through hole exposes the central portion of the middle optics piece 110 where a correction lens 140 is fixed to the middle optics piece 120. The second surface of the rear optics piece 130 includes at least one concave reflector surface 131 with respect to its first flat surface that is fixed to the middle optics piece 120 and is located in a peripheral region surrounding the through hole of the rear optics piece 130. The convex reflector surface 111 of the front optics piece 110 and the concave reflector surface 131 of the rear optics piece 130 are configured to form an optical telescope that directs the input light received by the peripheral ring shaped region in the first surface of the front optics piece 110 along a folded optical path between the first surface of the front optics piece 110 and the second surface of the rear optics piece 130 to pass through the central region of the rear optics piece 130 to reach the image sensor 150. In this telescope, the concave reflector surface 131 is the primary reflector and the convex reflector surface 111 is the secondary reflector. The reflector surfaces 131 and 111 can be aspheric, e.g., a parabola or a hyperbola. The correction lens 140 provides certain optical corrections to the output light from the telescope. The correction lens 140 may be a single piece lens or a composite lens having two or more lens components. In the illustrated example, the correction lens 140 is located within the hole of the rear optics piece 130. In other implementations, the correction lens 140 may be at another location and fixed to the other optics. The image sensor 150 is fixed in position relative to the rear optics piece 130 at a focal plane of the optical telescope to receive and detect output light from the correction lens 140.

The adhesive layer for engaging the three optics pieces 110, 120 and 130 can be implemented with selective adhesive materials including some that can be UV cured. The index of refraction, the adhesive bonding strength and other material properties such as the thermal expansion coefficient and degassing property should meet the requirements of the operation conditions of the telescope. Optically, the index refraction of the adhesive should match that of the optics pieces 11, 120 and 130. For space-related applications, the bonding strength of the adhesive layer should be sufficient to withstand the g-force experienced by the telescope in deployment. One example of commercial adhesive materials is Norland optical adhesive NOA88.

Figure 2:
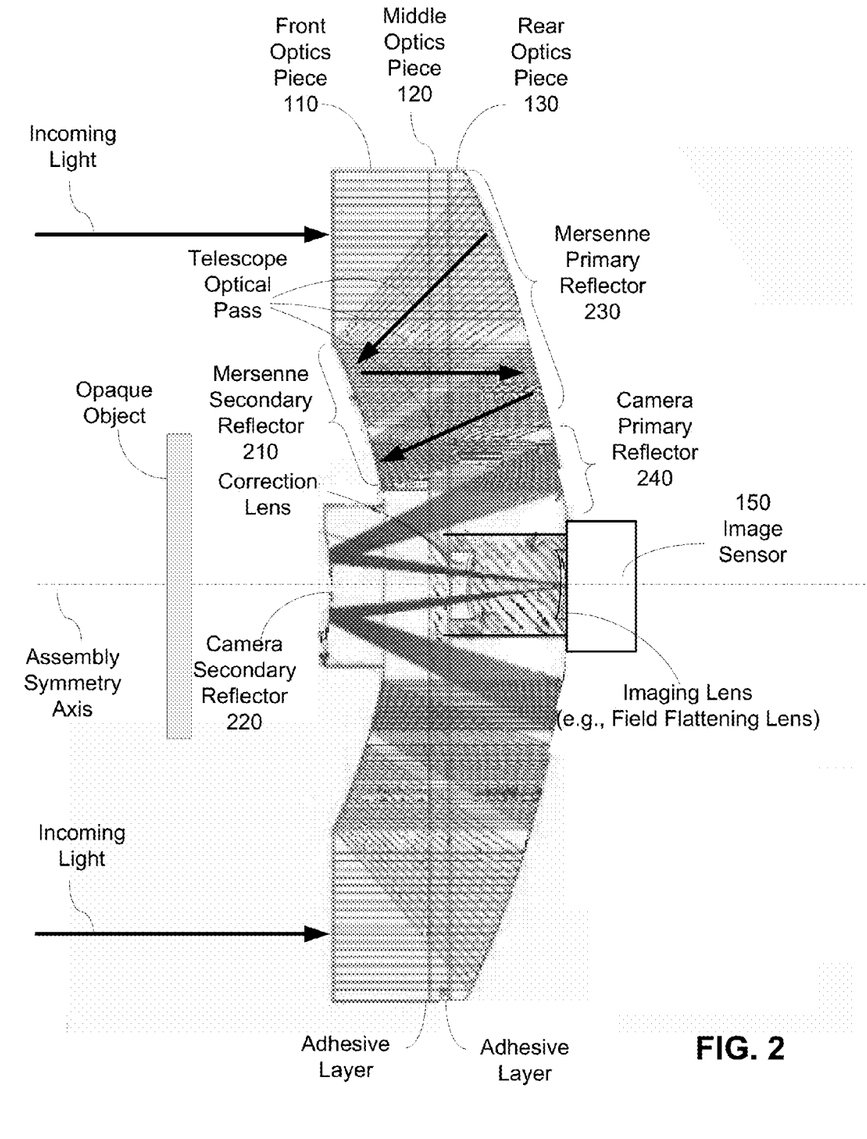

The integrated property of the telescope without movable or adjustable optical components in FIG. 1 can be used to construct more sophisticated telescopes. FIG. 2 shows an example of integrated telescope assembly that cascades two telescopes in series along the folded optical path between the front and rear optics pieces 110 and 130.

In FIG. 2, the front surface on the left hand side of the front optics piece 110 is structured to provide at least two convex reflector surfaces 210 and 220. Similarly, the rear surface on the right hand side of the rear optics piece 130 is structured to include at least two concave reflector surfaces 230 and 240. The convex reflector surface 220 is between the convex reflector surface 210 and the central region of the front optics piece 120. The concave reflector surface 240 is located in the peripheral region between the concave reflector surface 230 and the through hole in the central region of the rear optics piece 130. In this example, the reflector surfaces 230 and 210 form a pair as a Mersenne telescope where both surfaces may be parabolas to minimize spherical aberrations, coma and astigmatism for the large field of view (FOV) (e.g., diffraction-limited up to 2.5 degrees for a 35-cm telescope in some implementations). More specifically, the reflector surfaces 230 and 210 can be confocal parabolas. In addition, this example in FIG. 2 shows that the Mersenne telescope is a double-pass telescope where incoming light is reflected by each of the two reflector surfaces 230 and 210 two times—effectively doubling the magnification of the two reflector surfaces 230 and 210. The telescope can also be designed to reflect incoming light more than two times in other implementations to further increase the effective magnification.

In addition, the reflector surfaces 240 and 230, which are downstream along the optical train of the system, form a second telescope that receives the output of the Mersenne telescope before directing the light to the correction lens and another imaging lens before the image sensor (which may be a field flattening lens). This second telescope provides additional focusing to the light. In comparison with FIG. 1, the structure in FIG. 2 is more complex since the presence of two different curved surfaces 230 and 240 on the rear surface of the rear optics piece 130 may require them to have different aspherical profiles due to different optical requirements of the two cascaded telescopes. Similarly, the two curved surfaces 210 and 220 on the left hand side of the front optics piece 110 may also require them to have different aspherical profiles. This need of different surface profiles can complicate the fabrication. The reflector surface 220 can be formed in the same material as an integral part on the left side (front surface) of the front optics piece 110. FIG. 2, however, shows a different implementation for the surface 220 where the surface of the central portion of the front optics piece 110 is a flat surface and another piece of the transparent optical material is fixed to the flat surface and is structured to provide the reflector surface 220.

In the designs in FIGS. 1 and 2 and others in this document, the central portion in front of the left hand side of the front optics piece 110 is not used to receive any incoming light due to the presence of the reflector surfaces 210, 220 in FIG. 2 and reflector surface 111 in FIG. 1. To reduce optical noise, an opaque object may be placed in the front to block incoming light in this central portion. As described in the example in FIG. 5, an opaque disk may be integrated to a baffle that encloses the entire telescope to provide this blocking function.

Figure 3:
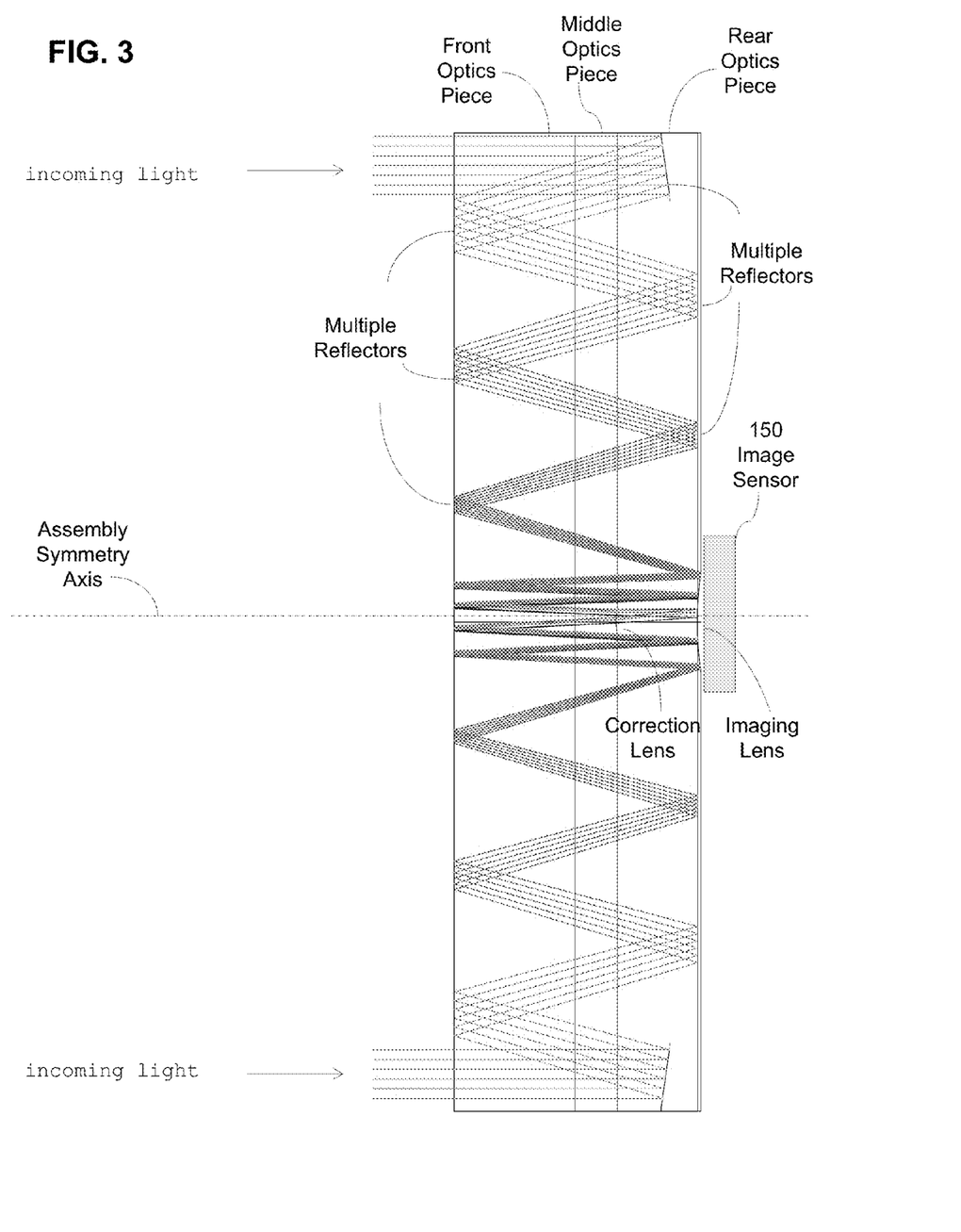

Turning now to FIG. 3, multiple reflectors can be provided in the front and rear optics pieces 110 and 130 to increase the number of reflections to increase the focal length of the telescope. Such designs of using additional reflections can maintain the relative compact size of the integrated telescope while increasing its focal length.

The image sensor 150 for capturing the output image of the telescope can be implemented by various image sensors. For example, the image sensor 150 can include a single image sensor array having image senor pixels monolithically formed on a common chip or substrate, such as a CMOS sensor chip or a CCD sensor chip. The integrated telescope as disclosed here may have a relative large FOV, e.g., a target area of 5 km×5 km in an airborne or satellite platform where such an integrated telescope is deployed for monitoring ground targets or aerial regions. Depending on the actual spatial resolution required for the telescope images, this could lead to a large number of pixels in a single frame or scene in the telescope. Accordingly, a large sensor chip is needed to capture the image information. CMOS monolithic sensor arrays can be expensive as their sizes increase.

Alternatively, the image sensor 150 can be formed by using several small-size monolithic image sensor arrays that are placed at different locations at the imaging plane or focal plane of the system to capture different spatial portions of an image scene captured by the telescope, respectively. In this design, each of the sensor arrays captures only a portion of the entire image scene and the captured images from the different image sensor arrays can be digitally synthesized together to form the full image of the entire image scene captured by the telescope. This design can be a lower cost alternative to the single chip sensor.

Figure 4:
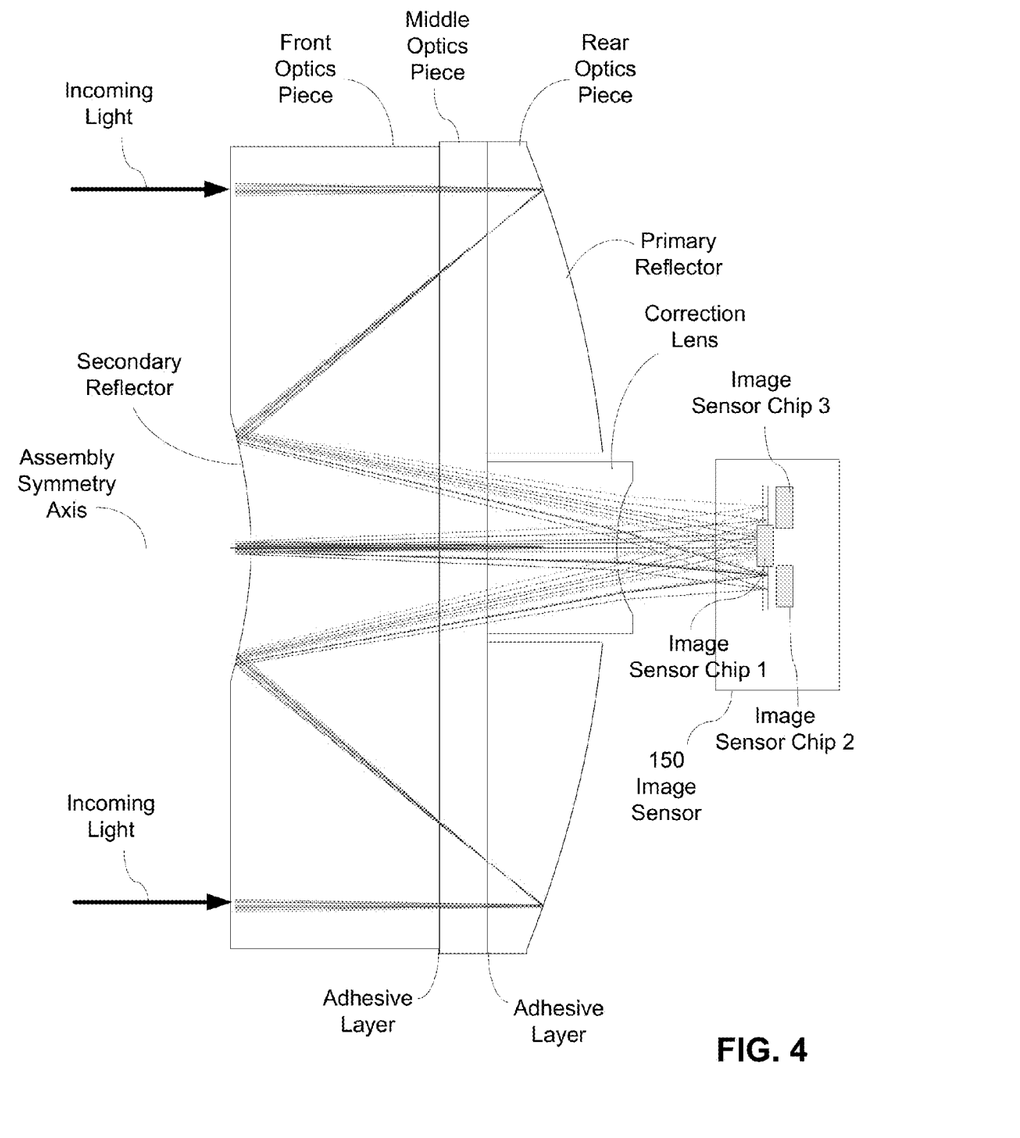
FIG. 4 shows an example of an integrated telescope assembly by permanently fixing optical components at pre-aligned positions where different image sensor chips are used to receive and detect different spatial portions of the image from the telescope, respectively.

The above multi-chip alternative design can be implemented by tiling the sensor chips together in a side by side manner within the same plane. In another implementation, referring to FIG. 4, the different image sensor chips 1, 2 and 3 can be used together without tiling located at different positions along an optical path of the light from the telescope (e.g., different chips are in different planes along the light propagation direction) in addition to being displaced in their location within the image plane for capturing different portions of the image scene. This is illustrated in FIG. 4. Notice that different sensor chips may have overlaps and this issue can be taken care of by digital synthesis of the images by remapping pixel readouts from the different sensor chips to a synthesized image display that represents the full image.

In various imaging applications, scattered light from a strong background can adversely affect or wash out the imaging contrast of the target area under imaging. For example, in imaging on a satellite or aircraft, sunlight is the dominating background. One way to mitigate such background issue is to implement a baffle structured to include a housing in which the integrated telescope unit is enclosed to block light from reaching the integrated telescope unit other than the front optics piece. The baffle includes a baffle front input port for receiving input light to reach the front optics pieces.

Figure 5:
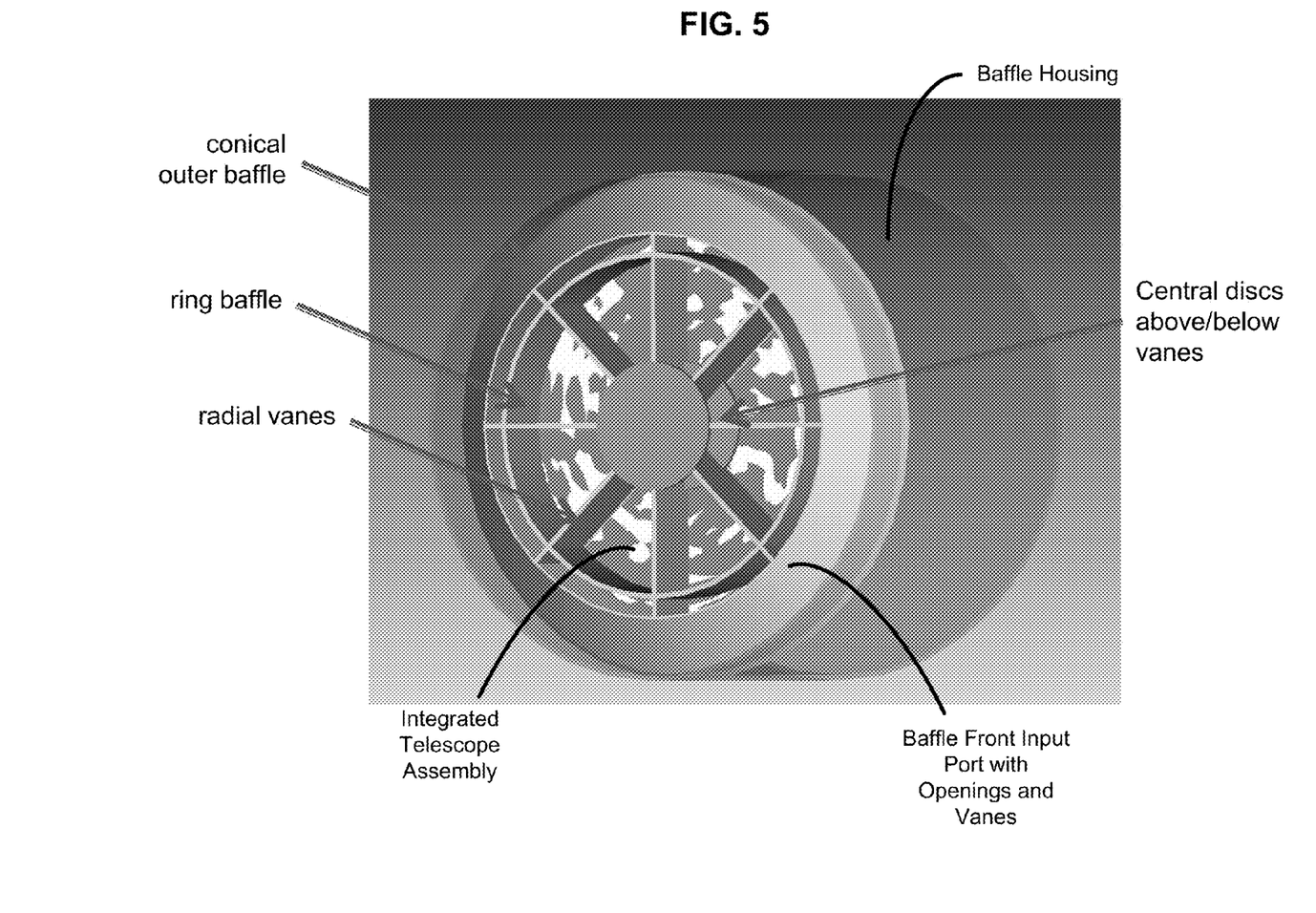
FIGS. 5, 6A and 6B illustrate a baffle mechanism for reducing adverse effect of scattered sunlight to the telescope operation.

This baffle design is shown in FIG. 5 where the baffle front input port includes vanes and sidewalls to reduce scattered sunlight from entering the integrated telescope unit. The vanes and sidewalls can be optically absorptive (e.g., blackened), or optically retro-reflective, or can have grooved structures. In this example, the baffle front input port includes a front opening with radial vanes, a central disk module with a top disk above the vanes and a bottom disk below the vanes (closer to the input of the telescope underneath), and a ring baffle.

Figure 6A:
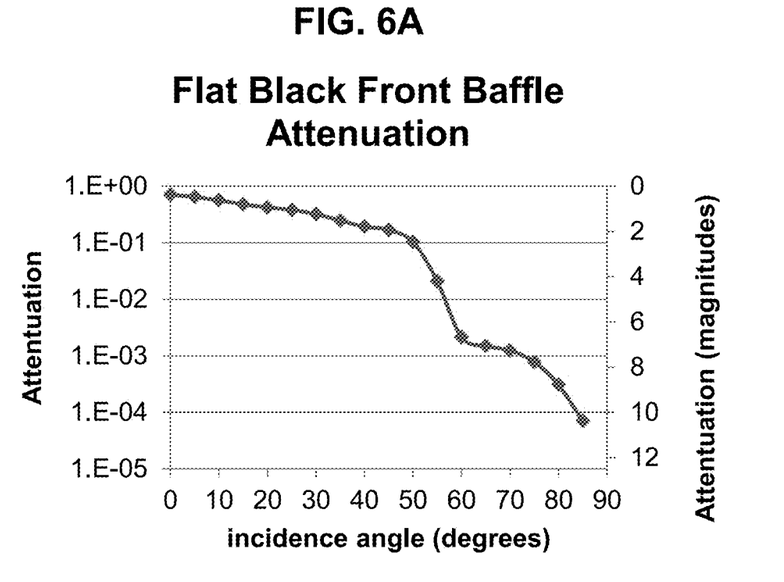

FIG. 6A show the light blocking effect by the baffle when the baffle surfaces are blackened to be optically absorptive where incident light with incident angles less than about 55 degrees can enter the telescope while light at larger angles is significantly attenuated. The telescope is oriented so that the sunlight is at large incidence angles. The scattered sunlight tends to be at large incident angles and thus is largely blocked out by the baffle.

Figure 6B:
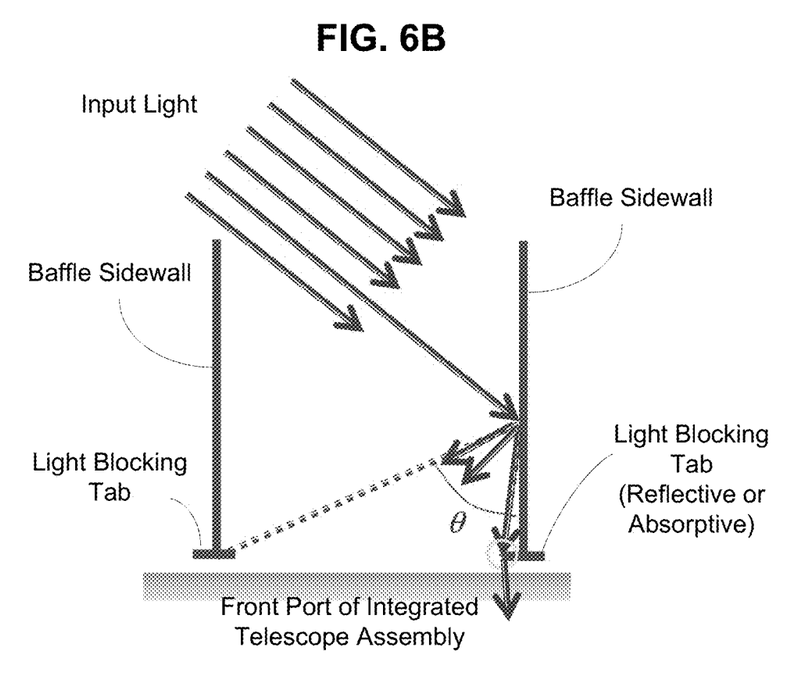

FIG. 6B shows a light blocking tab feature formed at the bottom of each sidewall in the baffle front input port to provide additional attenuation or blocking of scattered sunlight. For each sidewall of a vane or the ring baffle, an extension tab is formed at the bottom end of the sidewall above the integrated telescope unit and the extension tab is perpendicular to the sidewall. This extension tab can be optically absorptive (e.g., blackened) or optically reflective.

Figure 7:
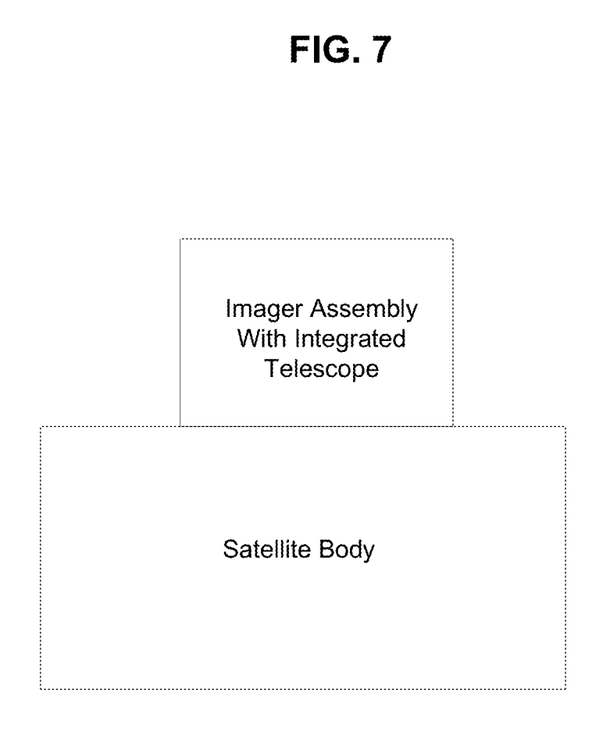
FIG. 7 shows a satellite carrying an integrated telescope assembly.

The above described integrated telescope designs can be used for providing telescopic imaging on a satellite or a moving platform due to their compact size, resistance of the optical alignment to shocks and vibrations, and their improved ability of blocking scattered background light. FIG. 7 shows that an integrated telescope assembly is mounted on a satellite or a moving platform by permanently fixing optical components at predefined positions without having movable or adjustable components in the integrated telescope assembly. The integrated telescope assembly includes front, middle and rear optics pieces of a transparent material, a correction lens and an image sensor that are permanently fixing to one another in an integrated packaging. A satellite equipped with such an integrated telescope assembly can be used to provide ground surveillance while the satellite is orbiting. A satellite equipped with such an integrated telescope assembly can be used to monitor upcoming objects or space debris in the space on or around the satellite orbit to collect data on presence of such objects or space debris or to avoid collision.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An integrated telescope, comprising:
a front optics piece formed of a transparent optical material and having a first surface and a second flat surface opposing the first surface, the first surface including at least one convex reflector surface with respect to the second flat surface within a central region of the front optics piece and a peripheral ring shaped region that surrounds the central region for receiving input light;
a middle optics piece formed of the transparent optical material and having a first flat surface fixed to the second flat surface of the front optics piece and a second flat surface opposing the first flat surface;
a rear optics piece formed of the transparent optical material and having a first flat surface fixed to the second flat surface of the middle optics piece and a second surface opposing the first flat surface, the second surface of the rear optics piece including a through hole in a central region of the rear optics piece which is aligned to the central region of the front optics piece and at least one concave reflector surface with respect to the first flat surface and located in a peripheral region surrounding the through hole of the rear optics piece,
wherein the convex reflector surface of the front optics piece and the concave reflector surface of the rear optics piece are configured to form an optical telescope that directs the input light received by the peripheral ring shaped region in the first surface of the front optics piece along a folded optical path between the first surface of the front optics piece and the second surface of the rear optics piece to pass through the central region of the rear optics piece;
a correction lens located in the through hole of the rear optics piece and fixed to the second flat surface of the middle optics piece to receive output light from the optical telescope; and
an image sensor fixed in position relative to the rear optics piece at a focal plane of the optical telescope to receive and detect output light from the correction lens,
wherein the front, middle and rear optics pieces, the correction lens and the image sensor are fixed in position relative to one another as an integrated telescope unit, and wherein the middle optics piece has a specific thickness to separate the front optics piece from the rear optics piece and to achieve a particular focal length for the integrated telescope.

2. The integrated telescope as in claim 1, comprising:
an adhesive at contact interfaces of the front, middle and rear optics pieces to fix their relative positions and spacing.

3. The integrated telescope as in claim 1, wherein:
the convex reflector surface of the front optics piece and the concave reflector surface of the rear optics piece are aspherical surfaces.

4. The integrated telescope as in claim 1, wherein:
the convex reflector surface of the front optics piece and the concave reflector surface of the rear optics piece are parabolas.

5. The integrated telescope as in claim 1, wherein:
the convex reflector surface of the front optics piece and the concave reflector surface of the rear optics piece are configured to reflect input light twice by each of the convex reflector surface of the front optics piece and the concave reflector surface of the rear optics piece.

6. The integrated telescope as in claim 1, wherein:
the convex reflector surface of the front optics piece and the concave reflector surface of the rear optics piece are parabolas to form a Mersenne telescope;
the first surface of the front optics piece includes at least one more convex reflector surface with respect to the second flat surface between the convex reflector surface and the central region of the front optics piece, and the second surface of the rear optics piece includes at least one more concave reflector surface with respect to the first flat surface and located in the peripheral region between the concave reflector surface as part of the Mersenne telescope and the through hole of the rear optics piece; and
the one more convex reflector surface on the first surface of the front optics piece and the one more concave reflector surface on the second surface of the rear optics piece are configured to form a second telescope downstream from the Mersenne telescope to direct output light from the Mersenne telescope to pass through the correction lens to the image sensor.

7. The integrated telescope as in claim 6, wherein:
the Mersenne telescope is an afocal telescope, and the second telescope downstream from the Mersenne telescope is a focal telescope.

8. The integrated telescope as in claim 1, comprising:
an imaging lens in an optical path between the correction lens and the image sensor.

9. The integrated telescope as in claim 1, wherein:
the image sensor includes a single image sensor array having image senor pixels on a common chip.

10. The integrated telescope as in claim 1, wherein:
the image sensor includes different image sensor arrays having image sensor pixels on different chips that are placed at different locations to capture different spatial portions of an image from the telescope, respectively, so that a combination of captured images from the different image sensor arrays represent the image from the telescope.

11. The integrated telescope as in claim 10, wherein:
the different image sensor arrays are located at different positions along an optical path of the light from the telescope to the image sensor.

12. The integrated telescope as in claim 1, comprising:
a baffle structured to include a housing in which the integrated telescope unit is enclosed to block light from reaching the integrated telescope unit other than the front optics piece, the baffle including a baffle front input port for receiving input light to reach the front optics pieces,
wherein the baffle front input port includes vanes and sidewalls to reduce scattered sunlight from entering the integrated telescope unit.

13. The integrated telescope as in claim 12, wherein:
the baffle front input port include surfaces that are blackened to be optically absorptive.

14. The integrated telescope as in claim 12, wherein:
the baffle front input port include surfaces that are optically reflective.

15. The integrated telescope as in claim 12, wherein:
the baffle front input port includes a sidewall and an extension tab at an end of the sidewall above the integrated telescope unit, and the extension tab is perpendicular to the sidewall.

16. A method for providing telescopic imaging on a satellite or a moving platform, comprising:
providing an integrated telescope assembly on a satellite or a moving platform by permanently fixing optical components at predefined positions without having movable or adjustable components in the integrated telescope assembly to improve immunity to vibrations and other perturbations during launch or normal motion of the satellite or moving platform, wherein the integrated telescope assembly includes front, middle and rear optics pieces of a transparent material, a correction lens and an image sensor that are permanently fixed in position relative to one another in an integrated packaging,
wherein the front optics piece includes a first surface and a second flat surface opposing the first surface with the first surface including at least one convex reflector surface with respect to the second flat surface within a central region of the front optics piece and a peripheral ring shaped region that surrounds the central region for receiving input light, the middle optics piece including a first flat surface fixed to the second flat surface of the front optics piece and a second flat surface opposing the first flat surface, the middle optics piece having a specific thickness to separate the front optics piece from the rear optics piece to achieve a particular focal length for the integrated telescope, and the rear optics piece including a first flat surface fixed to the second flat surface of the middle optics piece and a second surface opposing the first flat surface, the second surface of the rear optics piece including a through hole in a central region of the rear optics piece which is aligned to the central region of the front optics piece and at least one concave reflector surface with respect to the first flat surface and located in a peripheral region surrounding the through hole of the rear optics piece;
configuring the convex reflector surface of the front optics piece and the concave reflector surface of the rear optics piece to form an optical telescope that directs the input light received by the peripheral ring shaped region in the first surface of the front optics piece along a folded optical path between the first surface of the front optics piece and the second surface of the rear optics piece to pass through the central region of the rear optics piece;
fixing the correction lens to the second flat surface of the middle optics piece in the through hole of the rear optics piece; and
fixing the image sensor relative to the rear optics piece at a focal plane of the optical telescope to receive and detect output light from the correction lens.

17. The method as in claim 16, comprising:
selecting the middle optics piece from a set of flat plates to set a desired spacing between the front and rear optics pieces.

18. The method as in claim 16, wherein:
the convex reflector surface of the front optics piece and the concave reflector surface of the rear optics piece are aspherical surfaces.

19. The method as in claim 16, wherein:
the convex reflector surface of the front optics piece and the concave reflector surface of the rear optics piece are parabolas.

20. The method as in claim 16, comprising:
using different image sensor arrays having image sensor pixels on different chips as the image sensor to place the different image sensor arrays at different locations to capture different spatial portions of an image from the telescope, respectively; and
combing captured images from the different image sensor arrays to generate a full image from the telescope.

21. The method as in claim 16, comprising:
providing a baffle to enclose the integrated telescope assembly in a housing to block light from reaching the integrated telescope unit other than the front optics piece, wherein the baffle includes a baffle front input port for receiving input light to reach the front optics pieces;
providing vanes and sidewalls in the baffle front input port to reduce scattered sunlight from entering the integrated telescope assembly, wherein surfaces of the baffle front input port are blackened to be optically absorptive.

22. An integrated telescope, comprising:
a front optics piece formed of a transparent optical material and having a first surface and a second flat surface opposing the first surface, the first surface including at least one convex reflector surface with respect to the second flat surface within a central region of the front optics piece and a peripheral ring shaped region that surrounds the central region for receiving input light;
a rear optics piece located at a fixed in position relative to the front optics piece, the rear optics piece including the transparent optical material and having a first flat surface and a second surface opposing the first flat surface, the second surface of the rear optics piece including a through hole in a central region of the rear optics piece which is aligned to the central region of the front optics piece and at least one concave reflector surface with respect to the first flat surface and located in a peripheral region surrounding the through hole of the rear optics piece;
a middle optics piece fixed to the second flat surface of the front optics piece and to the first flat surface of the rear optics piece and having a specific thickness to separate the front optics piece from the rear optics piece to achieve a particular focal length for the integrated telescope,
wherein the convex reflector surface of the front optics piece and the concave reflector surface of the rear optics piece are configured to form an optical telescope that directs the input light received by the peripheral ring shaped region in the first surface of the front optics piece along a folded optical path between the first surface of the front optics piece and the second surface of the rear optics piece to pass through the central region of the rear optics piece;
a correction lens fixed in position relative to the rear optics piece to receive output light from the optical telescope; and
an image sensor fixed in position relative to the rear optics piece at a focal plane of the optical telescope to receive and detect output light from the correction lens,
wherein the front, the middle and the rear optics pieces, the correction lens and the image sensor are fixed in position relative to one another as an integrated telescope unit, and the convex reflector surface of the front optics piece and the concave reflector surface of the rear optics piece are configured to reflect input light twice by each of the convex reflector surface of the front optics piece and the concave reflector surface of the rear optics piece.

23. The integrated telescope as in claim 22, wherein:
the convex reflector surface of the front optics piece and the concave reflector surface of the rear optics piece are aspherical surfaces.

24. The integrated telescope as in claim 22, wherein:
the convex reflector surface of the front optics piece and the concave reflector surface of the rear optics piece are parabolas.

25. The integrated telescope as in claim 22, comprising:
an imaging lens in an optical path between the correction lens and the image sensor.

26. The integrated telescope as in claim 22, wherein:
the image sensor includes a single image sensor array having image senor pixels on a common chip.

27. The integrated telescope as in claim 22, wherein:
the image sensor includes different image sensor arrays having image sensor pixels on different chips that are placed at different locations to capture different spatial portions of an image from the telescope, respectively, so that a combination of captured images from the different image sensor arrays represent the image from the telescope.

28. The integrated telescope as in claim 22, comprising:
a baffle structured to include a housing in which the integrated telescope unit is enclosed to block light from reaching the integrated telescope unit other than the front optics piece, the baffle including a baffle front input port for receiving input light to reach the front optics pieces,
wherein the baffle front input port includes vanes and sidewalls to reduce scattered sunlight from entering the integrated telescope unit.

29. The integrated telescope as in claim 28, wherein:
the baffle front input port include surfaces that are blackened to be optically absorptive.

30. The integrated telescope as in claim 28, wherein:
the baffle front input port include surfaces that are optically reflective.

31. The integrated telescope as in claim 28, wherein:
the baffle front input port includes a sidewall and an extension tab at an end of the sidewall above the integrated telescope unit, and the extension tab is perpendicular to the sidewall.

* * * * *